United States Patent
Kawamura et al.

(10) Patent No.: US 6,480,456 B1
(45) Date of Patent: Nov. 12, 2002

(54) OPTICAL PICKUP APPARATUS FOR READING DIFFERENT TYPES OF RECORDING MEDIA AT DIFFERENT READING WAVELENGTHS

(75) Inventors: Makoto Kawamura, Tokorozawa (JP); Shinichi Takahashi, Tokorozawa (JP); Hirokatsu Nagatake, Tokorozawa (JP); Aki Yoshioka, Tokorozawa (JP); Mitsutoshi Sugano, Tokorozawa (JP); Ko Ishii, Tokorozawa (JP); Akira Miura, Tokorozawa (JP); Masayuki Koyama, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 85 days.

(21) Appl. No.: 09/704,063

(22) Filed: Nov. 2, 2000

(30) Foreign Application Priority Data

Dec. 22, 1999 (JP) .......................... 11-365583

(51) Int. Cl.7 ................................ G11B 7/00
(52) U.S. Cl. ...................... 369/120; 369/121
(58) Field of Search .......................... 369/44.23, 44.32, 369/53.2, 120, 121, 44.37, 44.38, 44.41, 53.22, 53.37, 112.01

(56) References Cited

U.S. PATENT DOCUMENTS

| | | | | |
|---|---|---|---|---|
| 4,993,036 A | * | 2/1991 | Ikeda et al. | |
| 5,986,998 A | * | 11/1999 | Park | 369/44.23 |
| 6,072,579 A | * | 6/2000 | Funato | 369/112.12 |
| 6,188,132 B1 | * | 2/2001 | Shih et al. | |
| 6,195,315 B1 | * | 2/2001 | Takahashi et al. | 369/44.23 |

\* cited by examiner

Primary Examiner—Paul W. Huber
(74) Attorney, Agent, or Firm—Morgan, Lewis & Bockius LLP

(57) ABSTRACT

An optical pickup apparatus which supports two wavelengths and is amenable to a reduction in size without employing a combining prism. The optical pickup apparatus employs a semiconductor laser device implemented in the form of a one-chip laser diode having two light sources for emitting a first laser beam and a second laser beam at a wavelength different from that of the first laser beam. A photodetector unit has a first detector section for receiving the first laser beam and a second detector section for receiving the second laser beam, and is set at positions at which the first and second laser beams follow return light paths of different lengths from an optical disc to the first and second detector sections.

11 Claims, 17 Drawing Sheets

IMAGE HEIGHT (DISTANCE FROM OPITCAL AXIS)

FIG. 7
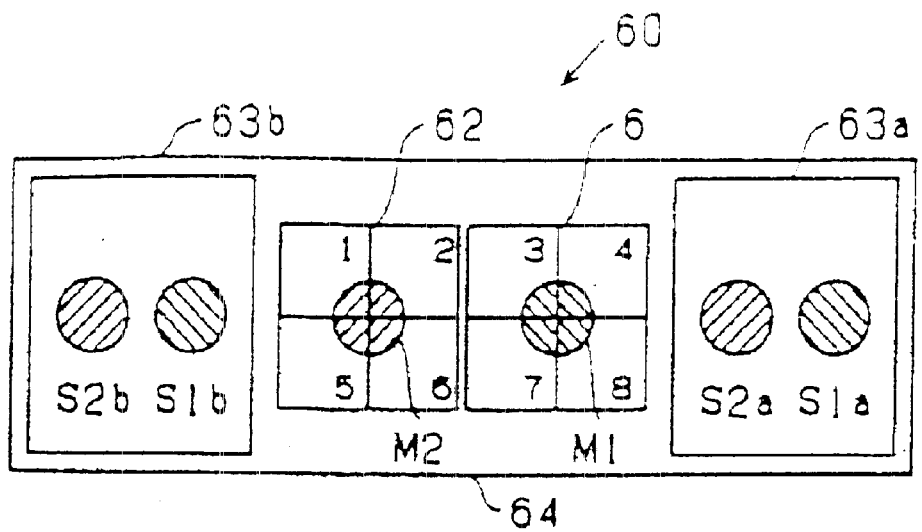
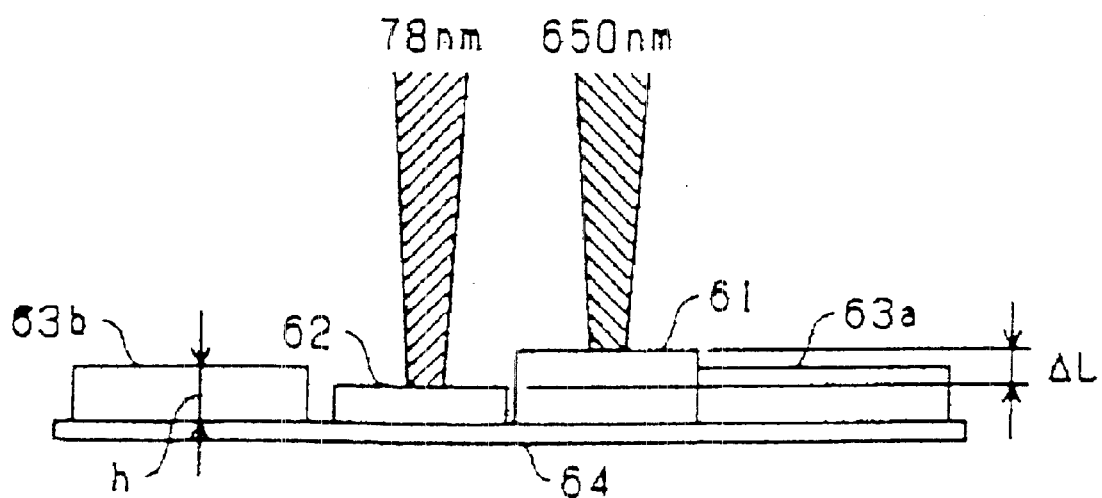
FIG. 8

OPTICAL PICKUP APPARATUS FOR READING DIFFERENT TYPES OF RECORDING MEDIA AT DIFFERENT READING WAVELENGTHS

BACKGROUND OF THE INVENTION

1. Field of the Invention

The present invention generally relates to an optical pickup apparatus capable of reading two or more types of recording media at different reading wavelengths, such as a DVD/CD compatible optical pickup apparatus, and more particularly, to an optical pickup apparatus which employs a semiconductor laser device comprising a one-chip laser diode for emitting two laser beams at different wavelengths.

2. Description of the Related Art

Conventionally, there have been extensively proposed DVD/CD compatible reproducing apparatuses which share a single optical pickup for reproducing CD and DVD. These compatible apparatuses are implemented as a DVD/CD compatible reproducing apparatus employing a one-wavelength bifocal optical pickup, a DVD/CD compatible reproducing apparatus employing a two-wavelength bifocal optical pickup, and so on.

When CD is compared with DVD in terms of the structure, DVD has a protection layer the thickness of which is approximately one half of the thickness of a protection layer of CD (0.6 mm). Therefore, assuming that a unifocal optical pickup is used to reproduce both the optical discs, when a light beam is converged so as to be optimal for an information recording surface of DVD, aberration such as spherical aberration occurs in the light beam, due to the protection layer of CD, through which the optical beam passes, having a lager thickness than DVD, so that the light beam cannot be converged optimally for an information recording surface of CD. In addition, since CD differs from DVD in the size of information pits formed thereon for recording, it is necessary to form beam spots of sizes optimal to the respective information pits on the information recording surface of CD or DVD in order to accurately read respective information pits.

The size of a beam spot is proportional to the ratio of the wavelength of a laser beam to the numerical aperture of an objective lens for focusing the laser beam on an information recording surface. In other words, with a fixed wavelength of a laser beam, the beam spot becomes smaller as the numerical aperture increases. Therefore, for reproducing CD and DVD with a unifocal optical pickup, when the numerical aperture is set, for example, to fit for the information pits of DVD with the wavelength of laser beam being fixed, a resulting beam spot is too small for the information pits of CD, causing distortion in a reproduced signal from the CD and hence difficulties in accurate reading. For this reason, DVD/CD compatible reproducing apparatuses employing a bifocal optical pickup are prevalent because of its ability of irradiating two laser beams for providing focal points at different positions on the same straight line and forming beam spots of appropriate sizes corresponding to the sizes of the respective information pits.

Some of such optical pickup apparatuses for use in DVD/CD compatible reproducing apparatuses require two light sources and an additional combining prism, resulting in a higher cost as compared with an optical pickup apparatus having a single light source. When a first light source irradiates from one surface of a first beam splitter, a second light source must irradiate from another surface of the first beam splitter perpendicular to the first light source, so that a larger space is required for positioning the optical system, and accordingly the optical pickup apparatus becomes larger in size.

OBJECT AND SUMMARY OF THE INVENTION

The present invention has been made in view of the problem mentioned above, and an object of the invention is to provide an optical pickup apparatus which is capable of supporting two wavelengths and amenable to a reduction in size without employing a combining prism.

To solve the problem mentioned above, an optical pickup apparatus according to a first aspect of the present invention is capable of reading information on recording media read by laser beams at different wavelengths. The optical pickup apparatus comprises light emitting means integrally including a first light source for emitting a first laser beam, and a second light source positioned in close proximity to the first light source for emitting a second laser beam at a wavelength different from a wavelength of the first laser beam; and an optical system including a plurality of optical elements passed by both the first and second laser beams for forming a light path for leading the first and second laser beams to a recording medium and for leading reflected light reflected by the recording medium to light detecting means, wherein the light detecting means includes a first detector for receiving the first laser beam and a second detector positioned in close proximity to the first detector for receiving the second laser beam, and the first and second detectors are arranged at positions such that the first and second laser beams follow return light paths of different lengths from the recording medium to the first and second detectors.

According to a second aspect of the present invention, in the optical pickup apparatus, the first and second laser beams follow different light paths from the light emitting means to the light detecting means.

According to a third aspect of the present invention, in the optical pickup apparatus, the first and second detectors are set at positions at which the first and second detectors receive focal points of the return light of the first and second laser beams, respectively.

According to a fourth aspect of the present invention, in the optical pickup apparatus according to the first or second aspect, the optical system includes an astigmatism element for applying the return light with astigmatism, and the first and second detectors are set to receive the first and second laser beams at positions at which the return light presents a substantially circular beam cross-section.

According to a fifth aspect of the present invention, in any of the optical pickup apparatuses, the detecting means includes the first and second detectors on the same plane, and is inclined with respect to the reflected beams.

According to a sixth aspect of the present invention, in any of the optical pickup apparatuses according to the first to fourth aspects, the light detecting means includes the first and second detectors formed at different heights, and is oriented substantially perpendicular to the return light.

According to a seventh aspect of the present invention, an optical pickup apparatus is capable of reading information on recording media read by laser beams at different wavelengths. The optical pickup apparatus comprises light emitting means integrally including a first light source for emitting a first laser beam, and a second light source positioned in close proximity to the first light source for emitting a second laser beam at a wavelength different from a wavelength of the first laser beam; and an optical system including a plurality of optical elements passed by both the first and second laser beams for forming a light path for leading the first and second laser beams to a recording medium and for leading reflected light reflected by the recording medium to light detecting means, wherein the optical system includes an astigmatism element for applying the return light with astigmatism, the light detecting means includes a first detector for receiving the first laser beam and a second detector for receiving the second laser beam, configured such that light receiving surfaces thereof lie in the same plane, and the light detecting means is arranged between two positions at which return light of the first and second laser beams presents a substantially circular beam cross-section, with the receiving surfaces oriented perpendicular to the return light of the first and second laser beams.

According to an eighth aspect of the present invention, in any of the optical pickup apparatuses, the light emitting means comprises a one-chip laser diode which is formed with an electrode of one of the first and second light sources as a common electrode.

According to a ninth aspect of the present invention, in the optical pickup apparatuses, the light detecting means is configured to selectively drive one of the first and second light sources depending on the type of a recording medium to be read.

BRIEF DESCRIPTION OF THE DRAWINGS

FIG. 7 is a top plan view of a photodetector unit used in the optical pickup apparatus according to the first embodiment of the present invention;

FIG. 8 is a side view of the photodetector unit used in the optical pickup apparatus according to the first embodiment of the present invention;

DETAILED DESCRIPTION OF THE PREFERRED EMBODIMENTS

Before proceeding to detailed description of the preferred embodiments, an exemplary conventional optical pickup apparatus will be described with reference to FIG. 1.

Figure 1:
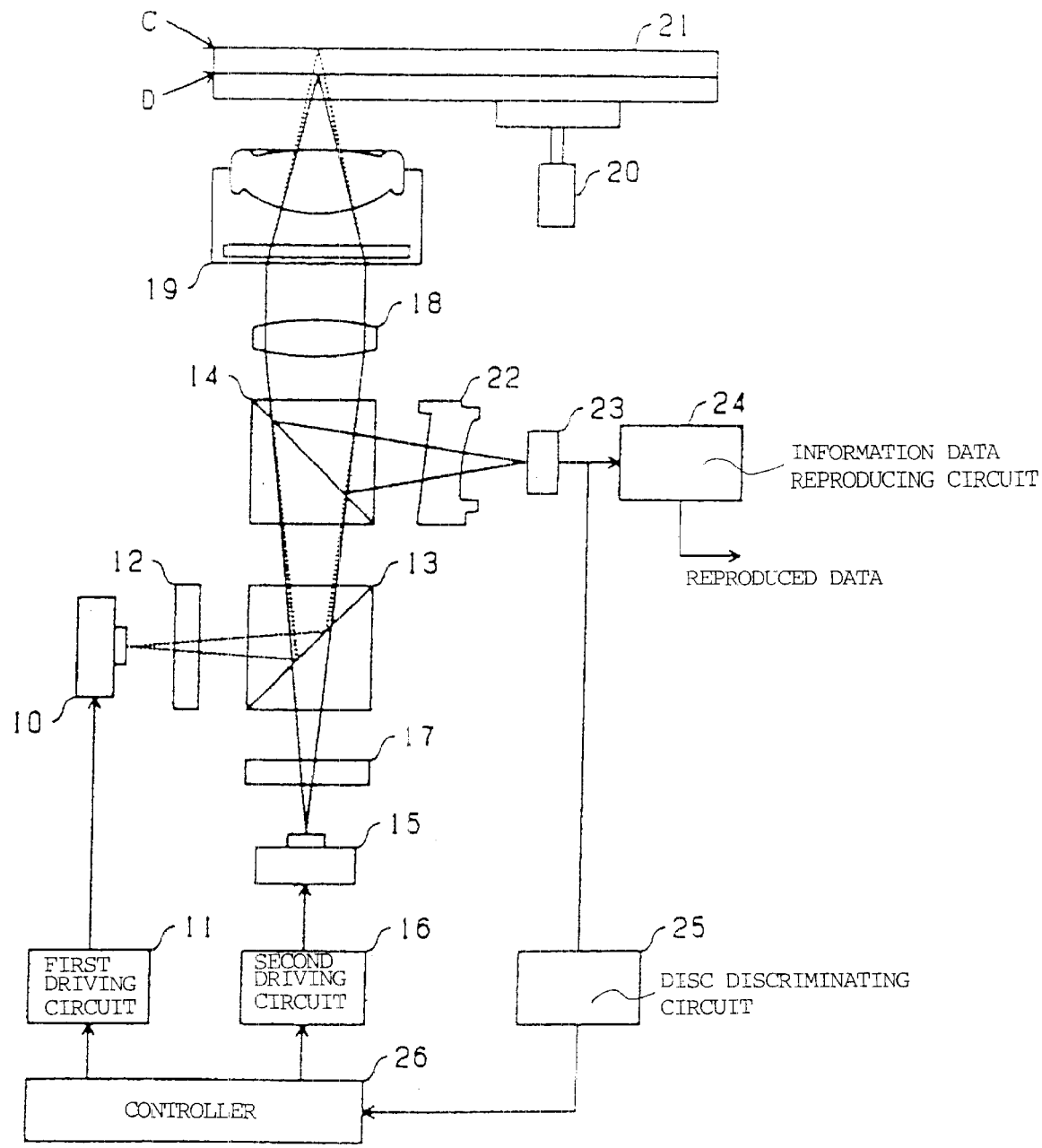
FIG. 1 is a schematic diagram illustrating the configuration of a conventional optical pickup apparatus.

An optical pickup apparatus illustrated in FIG. 1, for example, is a DVD/CD compatible pickup apparatus which combines a first light source 10 for CD and a second light source 15 for DVD with a first beam splitter 13 which functions as a combining prism, and employs a bifocal lens comprised of an objective lens and a diffraction element which functions as a numerical aperture limiting element. In the following, the illustrated optical pickup apparatus will be described in terms of configuration and operation.

Referring specifically to FIG. 1, the first light source 10 generates a laser beam (indicated by broken lines) at a wavelength (780 nm) optimal for reading information from CD in response to a driving signal from a first driving circuit 11, and irradiates the laser beam to a first beam splitter 13 through a grating 12 for producing three beams. The first beam splitter 13 reflects the laser beam from the first light source 10, and leads the reflected light to a second beam splitter 14.

The second light source 15 arranged at 90 degrees with respect to the first light source 10, on the other hand, generates a laser beam (indicated by solid lines) at a wavelength (650 nm) optical for reading information from DVD in response to a driving signal from a second driving circuit 16, and irradiates the laser beam to the first beam splitter 13 through a grating 17. The first beam splitter 13 transmits the laser beam from the second light source 15 and leads the same to the second beam splitter 14.

The second beam splitter 14 leads the laser beam supplied thereto through the first beam splitter 13, i.e., the laser beam from the first light source 10 or the second light source 15 to a bifocal lens 19 through a collimator lens 18. The bifocal lens 19 converges the laser beam from the second beam splitter 14 at one point, and irradiates the converged laser beam, as information reading light, to an information recording surface C of an optical disc 21 driven by a spindle motor 20 for rotation.

The laser beam (indicated by broken lines) from the first light source 10 is converged by the bifocal lens 19 such that it focuses on the information recording surface C of the optical disc 21. Also, the laser beam (indicated by solid lines) from the second light source 15 is converged by the bifocal lens 19 such that it focuses on an information recording surface D of the optical disc 21.

The information reading light from the bifocal lens 19 is irradiated onto the optical disc 21 and reflected therefrom to produce reflected light which passes through the bifocal lens 19 and the collimator lens 18, and is reflected by the second beam splitter 14 and irradiated to a photodetector unit 23 through a cylindrical lens 22 which functions as an astigmatism generating element. The photodetector unit 23 generates an analog electric signal having a level corresponding to the amount of light irradiated thereto, and supplies an information data reproducing circuit 24 and a disc discriminating circuit 25 with the analog electric signal as a read signal. The information data reproducing circuit 24 generates a digital signal based on the supplied read signal, and applies demodulation and error correction to the digital signal for reproducing information data. The disc discriminating circuit 25 discriminates the type of the optical disc 21 based on the size of a beam spot which is formed when the laser beam is irradiated to the optical disc 21, for example, as disclosed by the present applicant in Laid-open Japanese Patent Application No. 10-255274, and supplies the discrimination result to a controller 26. The controller 26 controls the first driving circuit 11 and the second driving circuit 16 to selectively drive either of them in response to a disc discriminating signal.

The controller 26 only drives the first driving circuit 11 when it is supplied with the disc discriminating signal indicative of CD from the disc discriminating circuit 25. Accordingly, the laser beam emitted from the first light source 10 is irradiated to the optical disc 21 through an optical system comprised of the grating 12, first beam splitter 13, second beam splitter 14, collimator lens 18 and bifocal lens 19. On the other hand, the controller 26 only drives the second driving circuit 16 when it is supplied with the disc discriminating signal indicative of DVD from the disc discriminating circuit 22.

Accordingly, the laser beam emitted from the second light source 15 is irradiated to the optical disc 21 through an optical system comprised of the grating 17, first beam splitter 13, second beam splitter 14, collimator lens 18 and bifocal lens 19. Stated another way, the optical pickup apparatus comprises the first light source 10 for generating a laser beam having a wavelength optimal for reading information from an optical disc 21 such as CD having a relatively low recording density, and the second light source 15 for generating a laser beam having a wavelength optimal for reading information from an optical disc 21 such as DVD having a high recording density, so as to alternatively select one corresponding to the type of the optical disc 21 from which information is to be reproduced.

Reflected light (return light) reflected by the information recording surface of the optical disc 21 passes through the bifocal lens 19 and the collimator lens 18, and reflected by the second beam splitter 14 and irradiated to the photodetector unit 23 through the cylindrical lens 22. In this event, since the return light of the first light source 10 and the return light of the second light source 15 differ in wavelength, they differ in refractive index when passing through optics and accordingly differ in focal length, so that so-called chromatism occurs. This chromatism is a cause of an error in a focus error signal. Specifically, when a focus servo is adjusted in accordance with the astigmatism method, a photodetector unit is generally disposed at a position at which a beam passing through an astigmatism generating element becomes substantially circular in cross-section when a disc is in a focal plane of an objective lens. However, if the return light of the first light source 10 differs from the return light of the second light source 15 in focal length, they also differ in the position at which the beam becomes substantially circular in cross-section, thereby causing an error in a focus error signal associated with one of the return lights.

As described above, a DVD/CD compatible reproducing apparatus requiring two light sources needs a combining prism and therefore results in a higher cost as compared with an optical pickup apparatus having a single light source. In addition, when the first light source 10 irradiates a light beam from one surface of the first beam splitter 13, the second light source 15 must irradiate a light beam from another surface perpendicular to the first light source 10, so that a larger space is required for positioning the optical system, and accordingly the optical pickup apparatus becomes larger in size.

In the following, one embodiment of the present invention will be described in connection with an optical pickup apparatus, taken as an example, for reproducing DVD and CD or CDR, which require different reading wavelengths. It should be noted that reproduced information recording media are not limited to the foregoing, and the present invention can be applied to any optical pickup apparatus which is adapted to reproduce a plurality of discs at different reading wavelengths.

Figure 2:
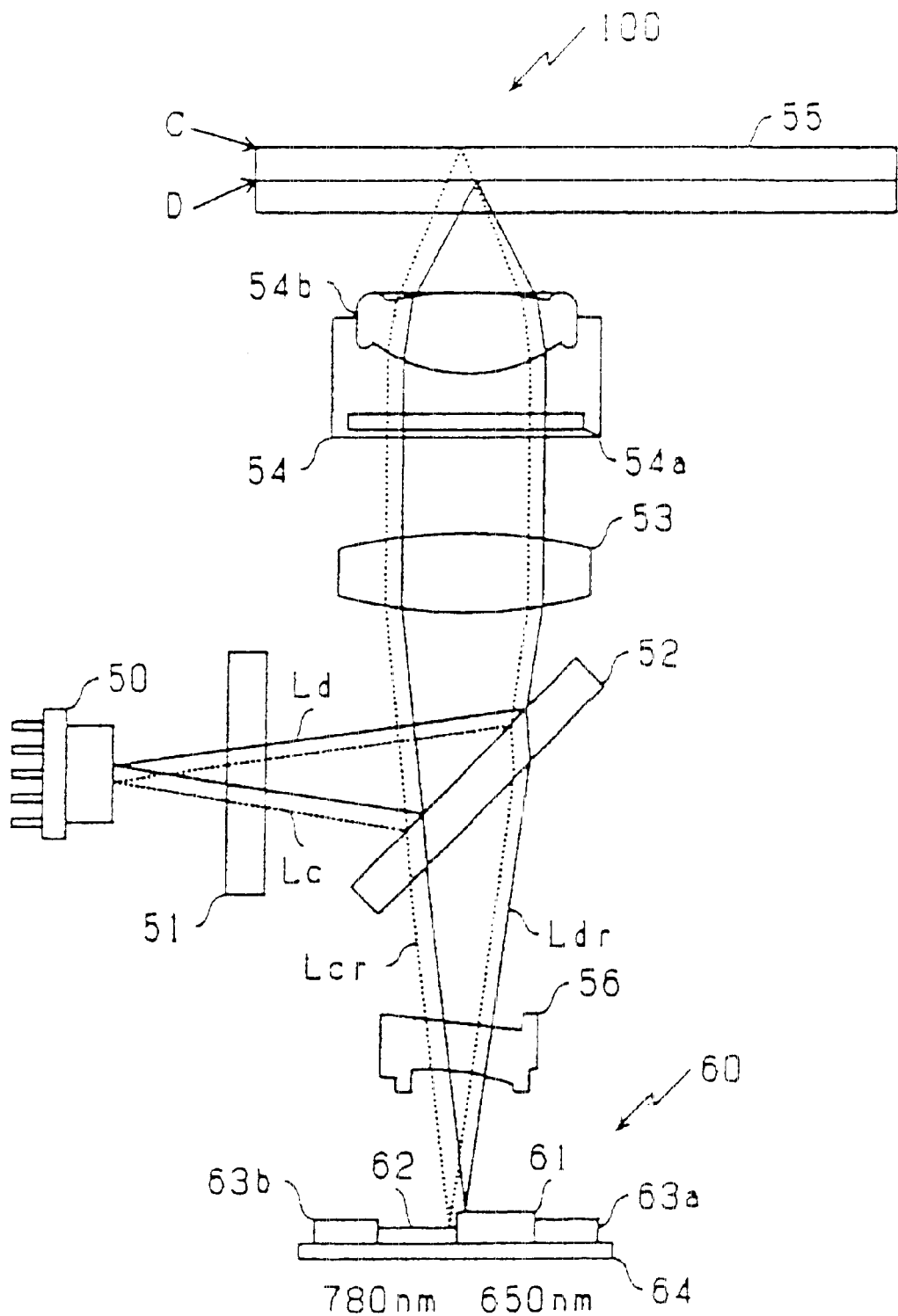
FIG. 2 is a schematic diagram illustrating the configuration of an optical pickup apparatus according to a first embodiment of the present invention.

FIG. 2 illustrates the configuration of a main portion of an optical pickup apparatus 100 according to a first embodiment of the present invention. The configuration of the optical pickup apparatus 100 will be described with reference to FIG. 2. The optical pickup apparatus 100 comprises a semiconductor laser device 50 functioning as light emitting means for emitting two laser beams at different wavelengths; a grating 51 for producing a pair of subbeams for producing a tracking error from an emitted laser beam; a half mirror 52 for reflecting a laser beam emitted from the semiconductor laser device 50 to lead the reflected laser beam to an optical disc 55, and for transmitting a laser beam reflected from a recording surface of the optical disc 55 to lead the laser beam toward a photodetector unit 60; a collimator lens 53 for converting the laser beam to parallel light; a bifocal lens 54 for converging laser beams at different wavelengths to focus at different positions on the same straight line to form beam spots of suitable sizes; a cylindrical lens 56 functioning as an astigmatism generating element; and the photodetector unit 60 functioning as light detecting means.

As appreciated, the optical pickup apparatus 100 of the first embodiment relies on an astigmatism method for focus servo adjustment, and a three-beam method for tracking servo adjustment. It should be noted that a driving circuit for the semiconductor laser device 50, and electric circuits such as a disc discriminating circuit and so on are similar to the prior art example, and therefore omitted in FIG. 2.

Figure 3:
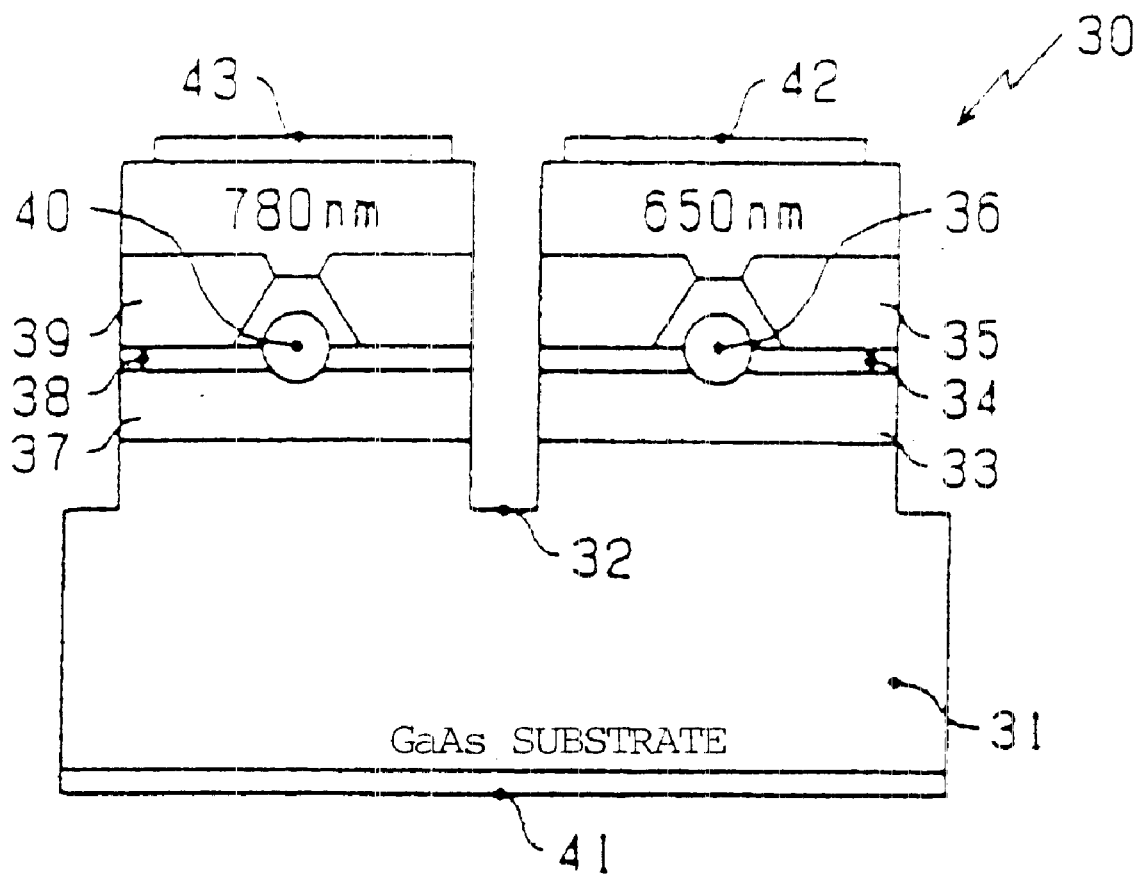
FIG. 3 is a cross-sectional view illustrating the structure of a semiconductor laser device for use in the optical pickup apparatus according to the first embodiment of the present invention.
Figure 4:
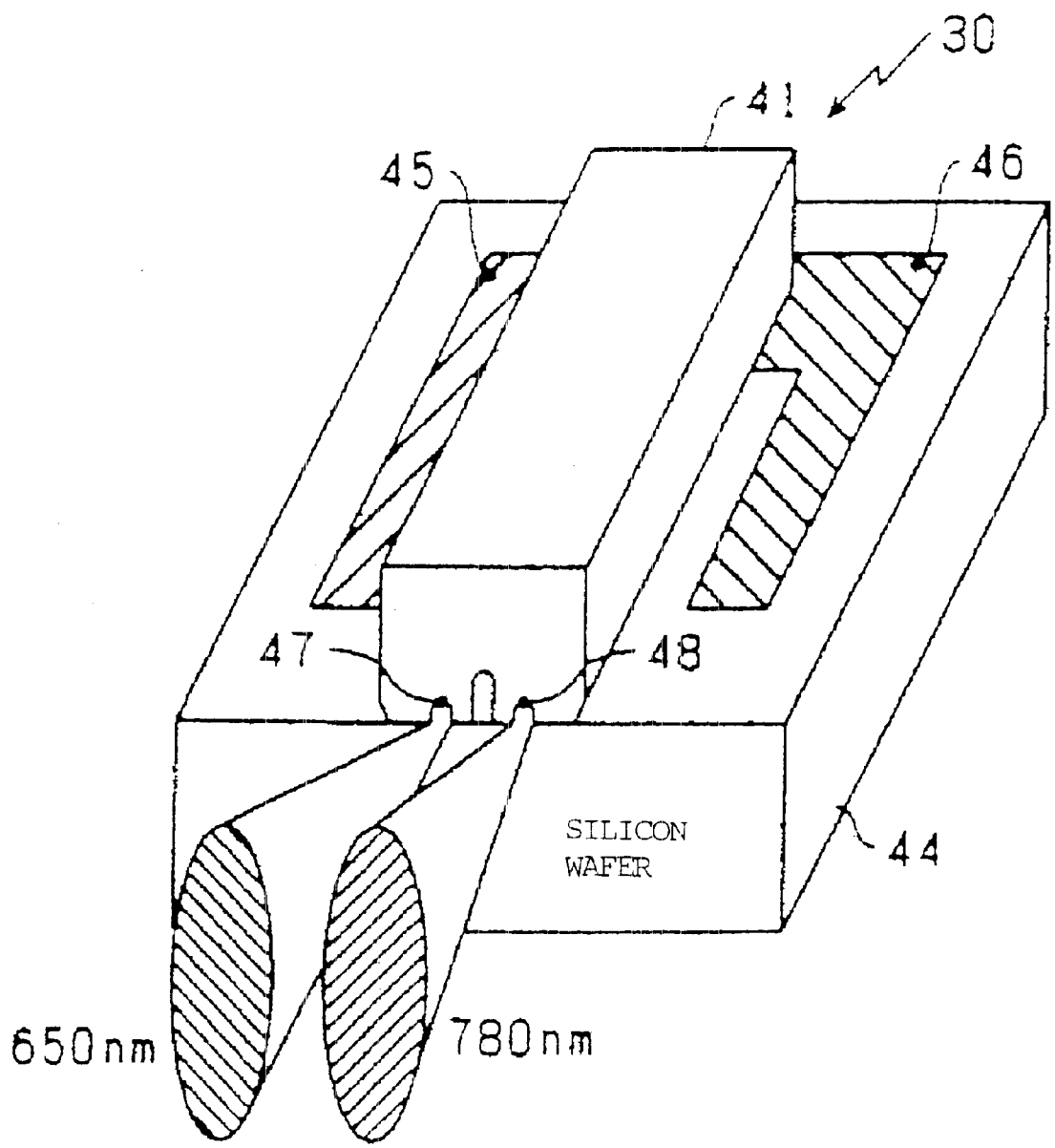
FIG. 4 is a perspective view illustrating the structure of the semiconductor laser device for use in the optical pickup apparatus according to the first embodiment of the present invention.

The semiconductor laser device 50 is a one-chip laser diode 30 which emits a laser beam at wavelength of 780 nm for reading CD and CDR, and a laser beam at wavelength of 650 nm for reading DVD. The structure of the semiconductor laser device 50 is illustrated in FIGS. 3 and 4. FIG. 3 illustrates a cross-sectional view of the one-chip laser diode 30, and FIG. 4 illustrates how the one-chip laser diode 30 is mounted on a submount.

As illustrated in FIG. 3, the one-chip laser diode 30 comprises a GaAs substrate 31 having dimensions on the order of 300 μm×400 μm×100–120 μm; and a laminate of an n-type AlXGaYIn1-X-YP layer 33, an AlXGaYIn1-X-YP active layer 34, and a p-type AlXGaYIn1-X-YP layer 35 formed on the GaAs substrate 31. A 650-nm light emitter 36 functioning as a first light source for emitting a first laser beam at wavelength of 650 nm is formed in the middle of the active layer 34. The one-chip laser diode 30 also comprises a laminate of an n-type AlXGa1-XAs layer 37, an AlXGa1-XAs active layer 38, and a p-type AlXGa1-XAs layer 39 on the GaAs substrate 31. A 780-nm light emitter 40 functioning as a second light source for emitting a second laser beam at wavelength of 780 nm is formed in the middle of the active layer 38. The two active layers 34, 38 of approximately 4 μm in thickness are separated by a separation groove 32. Also, the one-chip laser diode 30 is formed with a common electrode 41 on the bottom surface of the GaAs substrate 31, an Au electrode 42 for the 650-nm light emitter 36 on the top surface of the first light source, and an Au electrode 43 for the 780-nm light emitter 40 on the top surface of the second light source, respectively. In other words, the one-chip laser diode 30 is a semiconductor laser device 50 which is formed with one of electrodes associated with the first and second light sources as a common electrode.

It should be noted that a "one-chip" device generally refers to a device which comprises to two active layers of different types fabricated on one chip by a selective growth method or the like to enable the device to output laser beams at two wavelengths, whereas the "one-chip" device as used in the present invention also contemplates a device which is formed with two laser elements each for emitting a laser beam at a wavelength, for example, on a silicon wafer in a hybrid manner, i.e., a unit device which comprises two integrated one-wavelength laser elements.

As illustrated in FIG. 4, the one-chip laser diode 30 is used in the form of submount which is carried on a silicon wafer 44 formed with two Al electrodes 45, 46. Specifically, the submount is such that the one-chip laser diode 30 is carried on the silicon wafer 44 formed with the Al electrode 45 for the 650-nm light emitting element and the Al electrode 46 for the 780-nm light emitting element, with the common electrode 41 oriented upward, and the 650-nm electrode 42 and the 780-nm electrode 43 are soldered to the two Al electrodes 45, 46, respectively, with the common electrode 41 and the two Al electrodes 45, 46 being soldered to lead lines, not shown. Then, as a predetermined voltage is applied between the common electrode 41 and the Al electrode 45, a first laser beam at wavelength of 650 nm is emitted from a light emitting window 47. Also, as a predetermined voltage is applied between the common electrode 41 and the Al electrode 46, a second laser beam at wavelength of 780 nm is emitted from a light emitting window 48. Both of the laser beams are elliptic as can be seen also in FIG. 4. Then, the one-chip laser diode 30 in the submount form is accommodated, for example, in a case provided with light emitting windows and a plurality of output terminals, not shown, and used as the semiconductor laser device 50.

Next, description will be made on the operation of the optical pickup apparatus 100 according to the first embodiment of the present invention. The semiconductor laser device 50 used in the optical pickup apparatus 100 according to the first embodiment of the present invention has the 650-nm light emitter 36 for emitting the first laser beam at wavelength of 650 nm and the 780-nm light emitter 40 for emitting the second laser beam at wavelength of 780 nm formed on the same chip at different positions spaced by approximately 100 nm, as described above. Therefore, as illustrated in FIG. 2, the light path of the first laser beam does not match the light path of the second laser beam, and is slightly different therefrom.

It should be noted that two light paths are formed simultaneously since the first laser beam and the second laser beam are selectively driven. However, in the drawings of this specification, incident light Ld (solid lines in the drawings) of the first laser beam; incident light Lc (doted lines in the drawings) of the second laser beam; and return light Ldr of the first laser beam and return light Lcr of the second laser beam reflected by the respective information recording surfaces are all shown in the same drawings for the ease of the understanding.

Description will be next made on how the light emitter 36 and the light emitter 40 are positioned. Generally, in an optical pickup apparatus comprising a light source and an objective lens, the light source is used as positioned on the center axis of the objective lens. However, as described above, the semiconductor laser device 50 of the first embodiment emits the first laser beam and the second laser beam from positions spaced by approximately 100 nm from each other, so that the two laser beams cannot be positioned together on the center axis of the lens. It is therefore necessary to optimize the positional relationship of the two light sources with respect to the center axis of the optical system.

Figure 5:
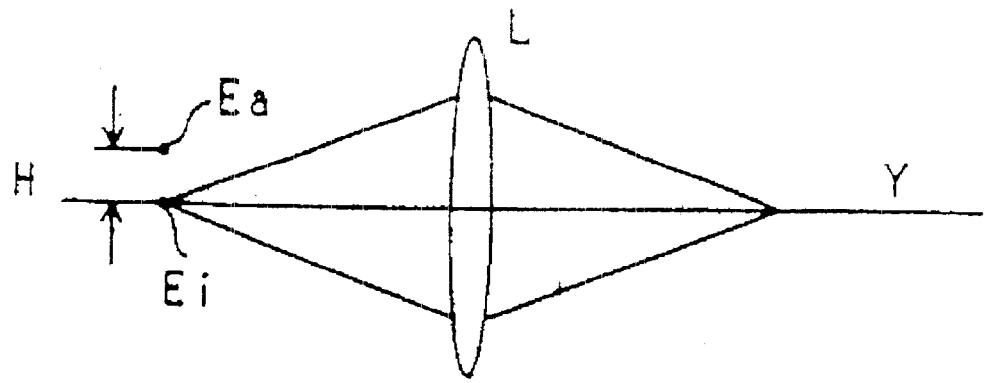
FIG. 5 shows the positional relationship between a light source and the center axis of a lens.

As illustrated in FIG. 5, it has been found that as a light source Ei is positioned on the central axis Y of an objective lens L, the beam diameter of the converged light is reduced at maximum. Therefore, the light source Ei positioned on the center axis Y of the objective lens L can be regarded as an ideal light emitting point. However, when the actual center Ea of the light source is not coincident with the optical axis Y, an "image height" H occurs, in which case "aberration" exists. Since "aberration" adversely affects a read signal, it should be desirably reduced as much as possible.

Figure 6:
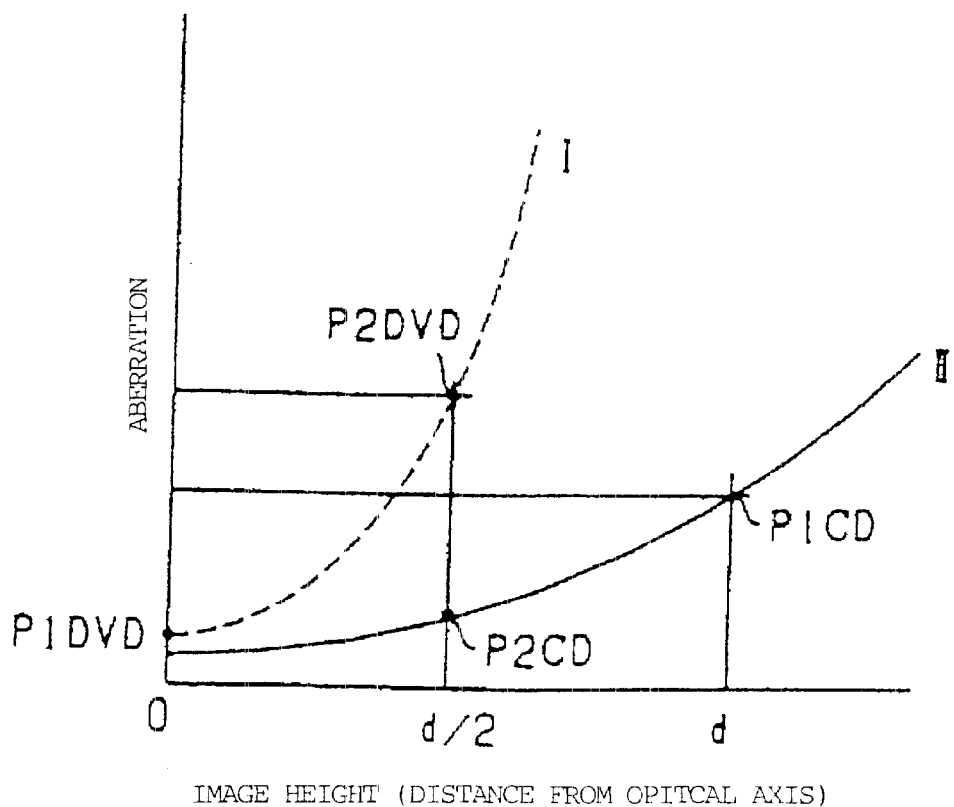
FIG. 6 is a graph showing the relationship between an image height and aberration.

FIG. 6 shows the relationship between the image height and the aberration, where a dotted line indicates the relationship between the image height and the aberration when DVD is reproduced, and a solid line indicates the relationship between the image height and the aberration when CD is reproduced. As can be seen in FIG. 6, the aberration during reproduction of DVD is large irrespective of the image height as compared with the aberration during reproduction of CD, and the proportion of an increase in the aberration during reproduction of DVD (the slop of the dotted line) is larger than the proportion of an increase in the aberration during reproduction of CD (the slop of the solid line). Also, even when the image height H is zero, i.e., the light emitting point is positioned on the optical axis, the aberration during reproduction of DVD is larger than the aberration during reproduction of CD. This is because information is recorded at a higher density on DVD than CD, so that the diameter of a beam spot irradiated to DVD is made smaller than that irradiated to CD. Stated another way, a higher recording density disc such as DVD, which is read by a laser beam at a shorter wavelength, is more susceptible to the adverse influence of the image height deviation than a lower recording density disc such as CD which is read by a laser beam at a longer wavelength.

To solve the above-mentioned problem, in the optical pickup apparatus 100 according to the first embodiment of the present invention, the laser device 50 has the 650-nm light emitter 36 for emitting the first laser beam positioned on the center axis of the optical system, or set the distance from the 650-nm light emitter 36 to the center axis of the optical system shorter than the distance from the 780-nm light emitter 40 for emitting the second laser beam to the center axis of the optical system. In other words, the image height deviation is reduced for DVD, which is more adversely affected by the image height deviation due to the aberration, as compared with CD.

Next, description will be made on the operation of the pickup apparatus illustrated in FIG. 2 for reproducing DVD and CD as recording media. The optical pickup apparatus 100 according to the first embodiment of the present invention discriminates a disc in a manner similar to the prior art example, and selectively drives one of the light sources in the semiconductor laser device 50 based on the result of discriminating the disc.

For reproducing an optical disc 55 which is DVD, incident light Ld (indicated by solid lines in FIG. 2) of the first laser beam emitted from the semiconductor laser device 50 is partially reflected by the half mirror 52 through the grating 51, converted to parallel light flux by the collimator lens 53, and incident on the bifocal lens 54. The first laser beam incident on the bifocal lens 54 is diffracted by a diffraction element 54a into zero-th order light, ±first-order light and other higher order light. Since the zero-th order light is used for reproducing DVD, the objective lens 54b converges the zero-th order light of the first laser beam on an information recording surface D of the optical disc 55. Then, return light Ldr of the first laser beam reflected by the information recording surface D of DVD passes through the bifocal lens 54 and the collimator lens 53, partially transmits the half mirror 52, and impinges on a first detector section 61 of the photodetector unit 60 through the cylindrical lens 56.

On the other hand, for reproducing an optical disc 55 which is CD, incident light Lc (indicated by dotted lines in FIG. 2) of the second laser beam emitted from the semiconductor laser device 50 is partially reflected by the half mirror 52 through the grating 51, converted to parallel light flux by the collimator lens 53, and then incident on the bifocal lens 54. The first laser beam incident on the bifocal lens 54 is diffracted by a diffraction element 54a into zero-th order light, ±first-order light and other higher order light. Since one of the i first-order light is used for reproducing CD, the objective lens 54b converges the ±first-order light of the incident light Lc of the second laser beam diffracted by the diffraction element 54a on an information recording surface C of the optical disc 55. Then, return light Lcr of the second laser beam reflected by the information recording surface C of CD passes through the bifocal lens 54 and the collimator lens 53, partially transmits the half mirror 52, and impinges on a second detector section 62 of the photodetector unit 60 through the cylindrical lens 56.

Since the two types of return light Ldr, Lcr reflected by the respective information recording surfaces C, D reach the photodetector unit 60 through the same optics including the collimator lens 53, half mirror 52 and cylindrical lens 56 after they pass through the bifocal lens 54, the return light paths are identical in length. However, since the first laser beam differs from the second laser beam in wavelength, they also differ in the refractive index when they pass through the optics, with the result that each return light Ldr, Lcr focuses at a different position in the optical axis direction of the return light.

Thus, the photodetector unit 60 used in the optical pickup apparatus 100 according to the first embodiment of the present invention positions the first detector section 61 and the second detector section 62 at different heights to receive the return light Ldr, Lcr at different positions, i.e., to provide different light path lengths for the return light Ldr, Lcr, such that each return light is received at its focal position. Specifically, the photodetector unit 60 is configured as illustrated in FIGS. 7 and 8. FIG. 7 shows a top plan view of the photodetector unit 60, while FIG. 8 shows a side view of the photodetector unit 60.

The photodetector unit 60, which is configured to support a three-beam method and an astigmatism method as illustrated in FIG. 7, comprises the first detector section 61 divided into four subregions 3, 4, 7, 8 for receiving a main beam M1 (main beam of the first laser beam) for DVD; and the second detector section 62 divided into four subregions 1, 2, 5, 6 for receiving a main beam M2 (main beam of the second laser beam) for CD. The first detector section 61 and the second detector section 62 are arranged in parallel with and in close proximity to each other. The photodetector unit 60 also comprises two subdetector sections 63a, 63b for receiving subbeams S1a, S2a, S1b, S2b of the first and second laser beams for use in generating a tracking error signal TE. The subdetector sections 63a, 63b are positioned on one and the other sides of the first detector section 61 and the second detector section 62 to sandwich them therebetween. The respective detector sections are disposed on a substrate 64.

Also, as can be seen in FIG. 8, the first detector section 61 and the second detector section 62 are arranged such that their light receiving surfaces are substantially perpendicular to the main beams of the return light Ldr, Lcr.

Further, the first detector section 61 and the second detector section 62 differ in the height in the main bean direction, for example, by ΔL such that they can receive the return light Ldr, Lcr of the first and second laser beams at proper positions. Specifically, the light receiving surface of the first detector section 61 is set at a position at which the return light Ldr, applied with astigmatism by the cylindrical lens 56, becomes substantially circular in cross-section. Similarly, the light receiving surface of the second detector section 62 is set at a position at which the return light Lcr, applied with astigmatism, becomes substantially circular in cross-section.

Further, the two subdetector sections 63a, 63b are set at a height h substantially in the middle of the height of the first detector section 61 and the height of the second detector section 62. Specifically, since the two subdetector sections 63a, 63b receive both of the subbeams S1a, S2a of the first laser beam and the subbeams S1b, S2b of the second laser beam, they are set at the height substantially in the middle of the heights of the first and second detector sections 61, 62 to minimize the adverse influence of chromatism.

It should be noted the height positions of the first detector section 61 and the second detector section 62 in the main beam direction are not limited to the positions mentioned above, but may be selected such that their light receiving surfaces are set closest possible to the positions at which the beams become substantially circular in cross-section, and such that the adverse influence of the chromatism can be reduced even slightly as compared with a photodetector unit having a first detector section and a second detector section with their light receiving surfaces formed on the same plane.

Figure 9:
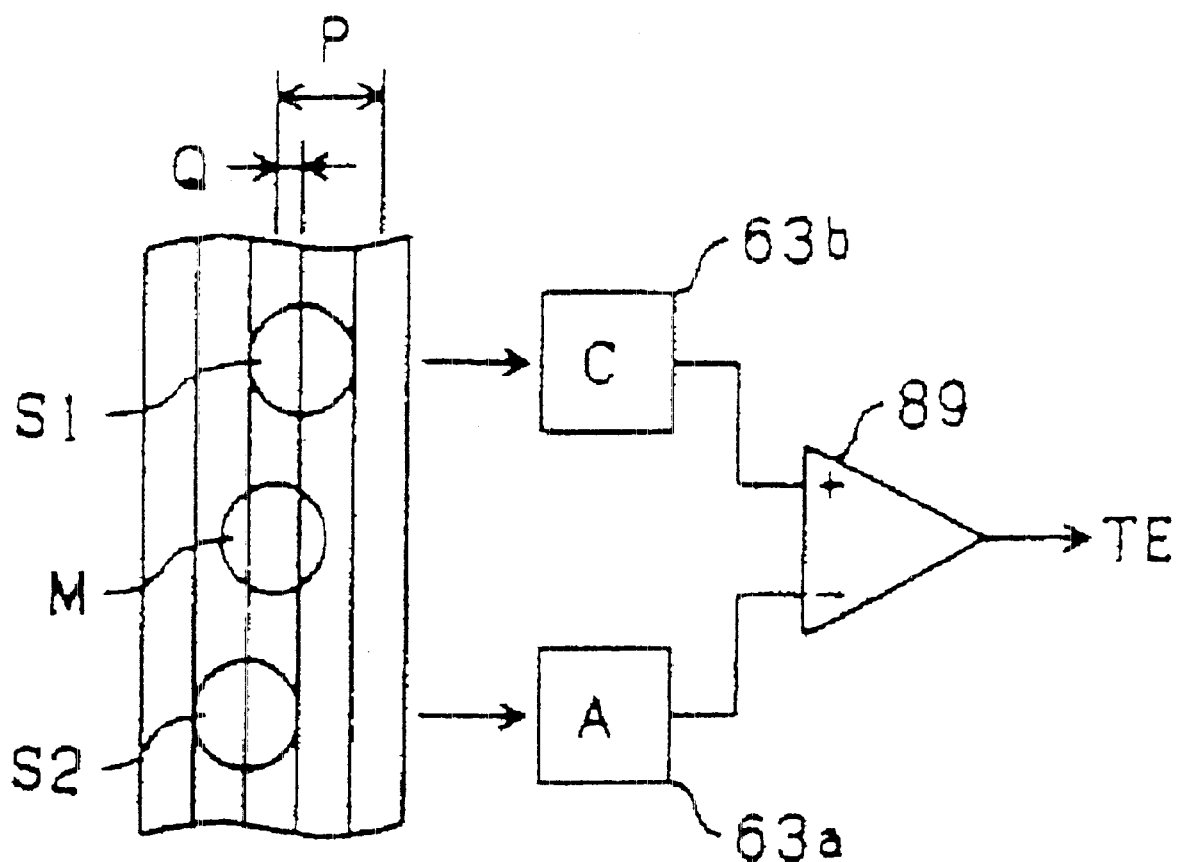
FIG. 9 shows how a three-beam method is implemented.

Next, the three-beam method and the astigmatism method used in the first embodiment will be outlined with reference to FIGS. 9 and 10A to 10C. As illustrated in FIG. 9, in the three-beam method, two subbeam spots S1, S2 are offset by Q from a main beam spot M in the opposite directions to each other. The offset amount Q is approximately one quarter of a track pitch P. Reflected light of each subbeam spot S1, S2 is detected by the subdetector section 63a, 63b. A difference between detection outputs of the subdetector sections 63a, 63b is used as a tracking error signal TE.

Figure 10A:
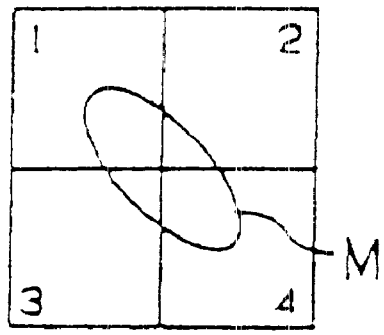
FIGS. 10A to 10C are diagrams for explaining an astigmatism method.
Figure 10B:
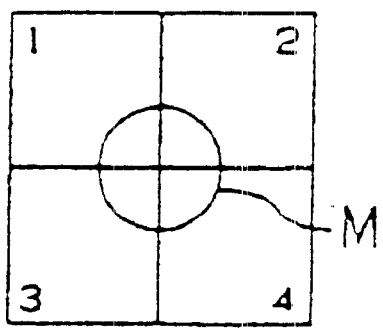
Figure 10C:
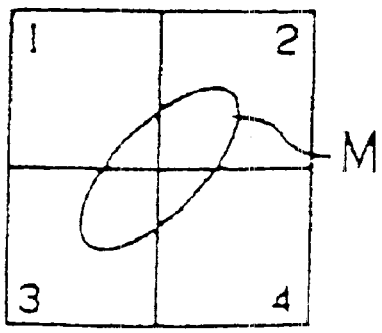

A four-divided detector for implementing the astigmatism method has one division line drawn in parallel with the direction of tracks on the information recording surface, and the other division line drawn in parallel with the radial direction of the optical disc. As illustrated in FIG. 10A, when the beam spot is substantially circular, the areas of the beam spot irradiated to the respective light receiving subregions divided by the division lines are equal, so that the focus error signal component FE is "0." When the beam is out of focus, an elliptic beam spot, longer in a diagonal direction, is formed by the astigmatism characteristic of the cylindrical lens 56, as illustrated in FIGS. 10B or 10C. In this case, the areas of the beam spot irradiated to the light receiving subregions on one diagonal are different from the areas of the beam spot irradiated to the light receiving subregions on the other diagonal, so that the difference is output as the focus error signal FE. Then, an electric signal corresponding to a spot image focused on the respective light receiving subregions is supplied to a demodulator circuit and an error detector circuit.

Figure 11:
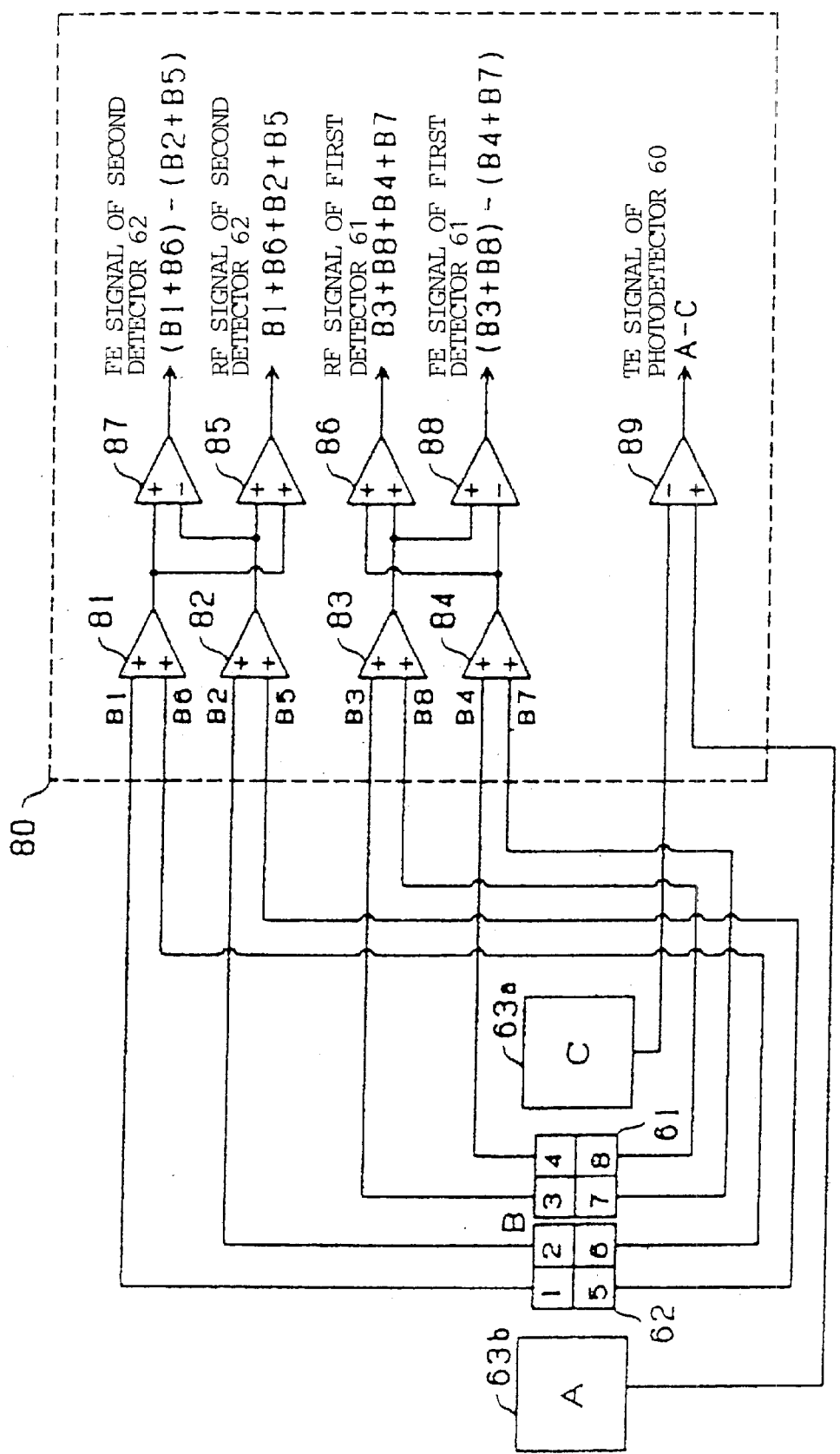
FIG. 11 is a block diagram illustrating a processor for processing a detection signal of a photodetector unit.

Next, a processing circuit for calculating the tracking error signal TE, focus error signal FE, and RF signal from electric signals generated by the photodetector unit 60 of the first embodiment will be described with reference to FIG. 11. As illustrated in FIG. 11, a processor 80 comprises six adders 81–86 and three subtractors 87–89. A detection signal from the subdetector section 63a is designated by A; a detection signal from the subdetector section 63b, by C; and eight detection signals output from the subregions 1, 2, 5, 6 of the first detector section and the subregions 3, 4, 7, 8 of the second detector section, by B1–B8, respectively.

First, the two subdetector sections 63a, 63b are provided for detecting a tracking error signal shared by the first laser beam and the second laser beam. The detection signals A, C output from the two subdetector sections 63a, 63b are subtracted by a subtractor 89 to generate a signal A–C which serves as the tracking error signal TE.

Next, in the first and second detector sections 61, 62 which output detection outputs B1–B8 from the respective four-divided detector sections, the detection outputs B1, B6 output from the second detector section 62 are added by the adder 81, while the detection outputs B2, B5 are added by the adder 82. Then, outputs of the adders 81, 82 are added by the adder 85. An output signal of the adder 85 is B1+B2+B5+B6 which serves as an RF signal (second RF signal) of the second detector section 62. The outputs of the adders 81, 82 are also subtracted by the subtractor 87. An output signal of the subtractor 87 is (B1+B6)−(B2+B5) which serves as a focus error signal FE (second FE signal) of the second detector section 62.

On the other hand, the detection outputs B3, B8 output from the first detector section 61 are added by the adder 83. The detection outputs B4, B7 in turn are added by the adder 84. Then, outputs of the adders 83, 84 are added by the adder 86. An output signal of the adder 86 is B3+B8+B4+B7 which serves as an RF signal (first RF signal) of the first detector section 61. The outputs of the adders 83, 84 are also subtracted by the subtractor 88. An output signal of the subtractor 88 is (B3+B8)−(B4+B7) which serves as a focus error signal FE (first FE signal) of the first detector section 61.

Figure 12:
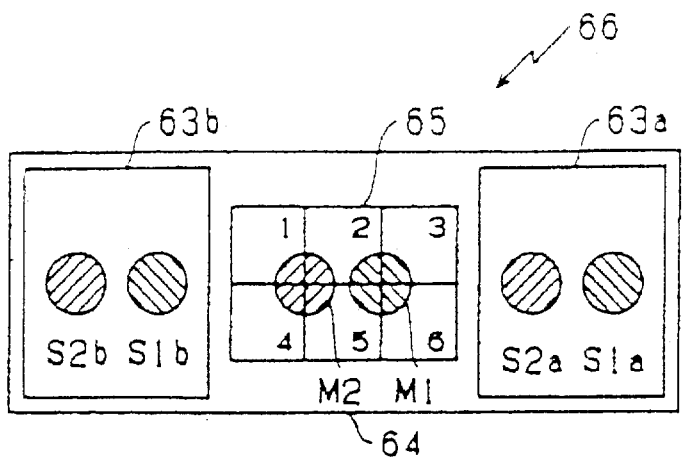
FIG. 12 is a top plan view of a photodetector unit used in an optical pickup apparatus according to a second embodiment of the present invention.
Figure 13:
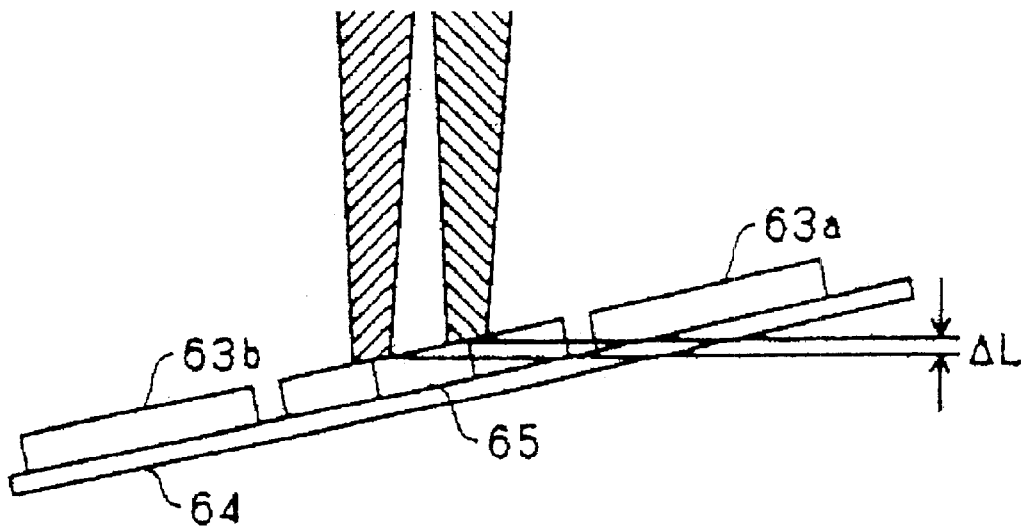
FIG. 13 is a side view of the photodetector unit used in the optical pickup apparatus according to the second embodiment of the present invention.

Next, a second embodiment of the optical pickup apparatus 100 according to the present invention will be described with reference to FIGS. 12 and 13. The second embodiment differs from the first embodiment in the configuration of a photodetector unit 66, and the rest of the configuration is identical to the first embodiment. FIG. 12 shows a top plan view of the photodetector unit 66, and FIG. 13 shows a side view of the photodetector unit 66.

The photodetector unit 66 illustrated in FIG. 12 comprises a six-divided detector section 65, which uses a portion of light receiving regions of the first detector 61 and the second detector 62 commonly for receiving main beams M1, M2 of the first and second laser beams; and two subdetector sections 63a, 63b, which are larger in area than the six-divided detector section 65, for receiving subbeams S1a, S2a, S1b, S2b of the first and second laser beams for use in generating a tracking error signal TE. The six-divided detector section 65 and the two subdetector sections 63a, 63b are formed on a substrate 64. Also, the six-divided detector section 65 and the two subdetector sections 63a, 63b are identical in height such that their light receiving surfaces lie in the same plane. Further, the photodetector unit 66 is configured such that the substrate 64 is inclined as illustrated in FIG. 13 to reduce the adverse influence of chromatism, so that the light receiving surface for receiving the main beam M1 of the first laser beam differs in height from the light receiving surface irradiated with the main beam M2 of the second laser beam by ΔL in the main beam direction.

Figure 14:
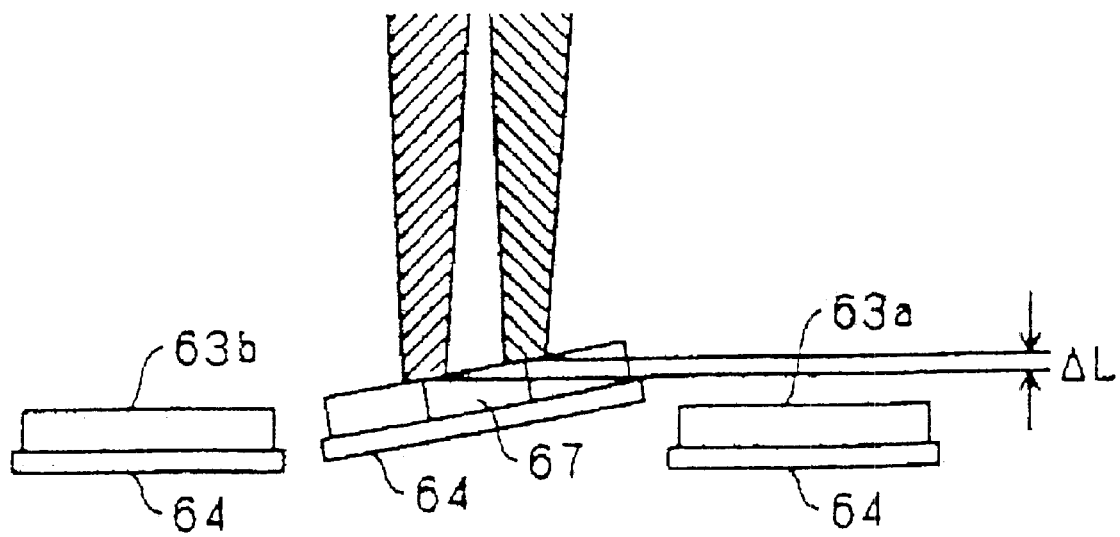
FIG. 14 is a top plan view of a photodetector unit used in an optical pickup apparatus according to the second embodiment of the present invention.

A photodetector unit 66 illustrated in FIG. 14 is an exemplary application of the second embodiment, in which only a six-divided detector section 65 is inclined, while subdetector sections 63a, 63b are arranged such that their light receiving surfaces are perpendicular to the main beams of the first and second laser beams. The height positions in the main beam direction of the light receiving surface for receiving the main beam M1 of the first laser beam and the light receiving surface irradiated with the main beam M2 of the second laser beam may be set as appropriate in order to eliminate the adverse influence of chromatism in a manner similar to the first embodiment.

Referring back to FIG. 12, the main beam M1 of the first laser beam is received by subregions 2, 3, 5, 6 of the six-divided detector section 65, while the main beam M2 of the second laser beam is received by subregions 1, 2, 4, 5 of the six-divided detector section 65. As appreciated, the subregions 2, 5 of the detector section 65 are used commonly for receiving the main beams M1, M2.

Therefore, when the first laser beam is received, detection outputs from the subregions 2, 3, 5, 6 are processed to produce B2+B6+B3+B5 which serves as an RF signal for DVD, and to produce (B2+B6)−(B3+B5) which serves as a focus error signal FE for DVD. Similarly, when the second laser beam is received, B1+B5+B2+B4 serves as an RF signal for CD, while (B1+B5)−(B2+B4) serves as a focus error signal FE for CD. The tracking error signal TE is represented by A-C as is the case of the first embodiment. The photodetector unit 66 configured as described above can produce similar effects to those of the photodetector unit 60 used in the first embodiment.

Figure 15:
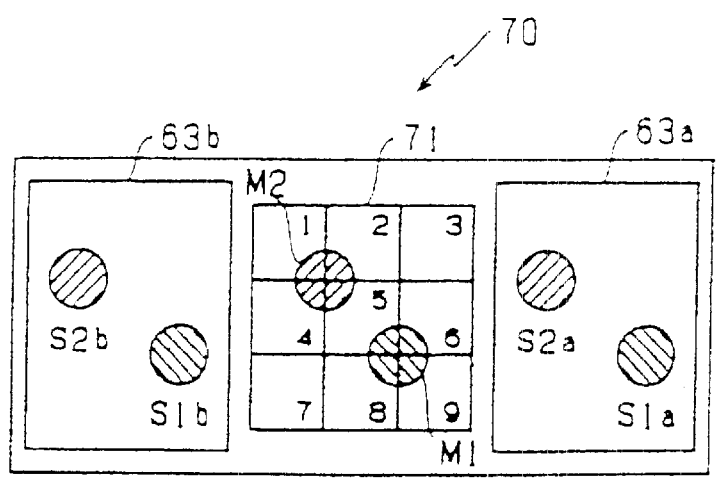
FIG. 15 is a side view of the photodetector unit used in the optical pickup apparatus according to a third embodiment of the present invention.
Figure 16:
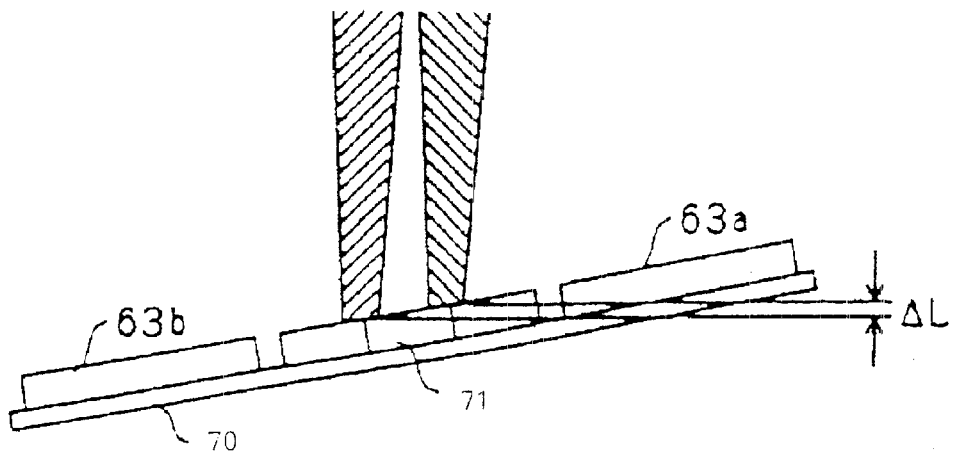
FIG. 16 is a side view of the photodetector unit used in the optical pickup apparatus according to the third embodiment of the present invention.

Next, a third embodiment of the optical pickup apparatus 100 according to the present invention will be described with reference to FIGS. 15 and 16. The third embodiments differs from the first embodiment in the configuration of a photodetector unit 70, and the rest of the configuration is identical to that of the first embodiment. FIG. 15 shows a top plan view of the photodetector unit 70, and FIG. 16 shows a side view of the photodetector unit 70.

The photodetector unit 70 comprises a nine-divided detector section 71 having nine light receiving regions comprised of subregions 1–9 arranged in three columns and three rows; and two subdetector sections 63a, 63b, which are larger in area than the nine-divided detector section 71, for receiving subbeams S1a, S2a, S1b, S2b of the first and second laser beams for use in generating a tracking error signal TE. The nine-divided detector section 71 and the two subdetector sections 63a, 63b are formed on a substrate 64. Also, the nine-divided detector section 71 and the two subdetector sections 63a, 63b are identical in height such that their light receiving surfaces lie in the same plane. Further, similarly to the second embodiment, the photodetector unit 70 is configured such that the substrate 64 is inclined as illustrated in FIG. 16 to reduce the adverse influence of chromatism, so that the light receiving surface for receiving the main beam M1 of the first laser beam differs in height from the light receiving surface irradiated with the main beam M2 of the second laser beam by ΔL in the main beam direction.

As illustrated in FIG. 15, the main beam M1 of the first laser beam is received by subregions 5, 6, 8, 9, while the main beam M2 of the second laser beam is received by subregions 1, 2, 4, 5. Therefore, when the first laser beam is received, B5+B9+B6+B8 is generated as an RF signal for DVD, and (B5+B9)−(B6+B8) is generated as a focus error signal FE for DVD. On the other hand, when the second laser beam is received, B1+B5+B2+B4 is generated as an RF signal for CD, and (B1+B5)−(B2+B4) is generated as a focus error signal FE for CD. The tracking error signal TE is represented by A-C as is the case of the first and second embodiments.

Next, description will be made on the advantage provided by using the photodetector unit 70 having the nine-divided detector section 71. As mentioned above, the beam emitted from the semiconductor laser device 50 has a substantially elliptic spot shape, for which a design approach is known for accomplishing desired reading performance by setting the angle of the major axis of the beam spot with respect to the track on the disc as appropriate. Assuming that the photodetector unit 66 illustrated in FIG. 7, for example, is used, this setting involves an adjustment of the position of the photodetector unit 66 in accordance with an adjustment in position of the semiconductor laser device 50. However, by using the photodetector unit 70 having the nine-divided detector section 71 of the third embodiment, the substantially elliptic spot can be adjusted in angle without adjusting the position of the photodetector unit 70. This angle adjustment will be described below specifically with reference to FIGS. 17A to 17C, 18A to 18C and 19A to 19C.

Figure 17A:
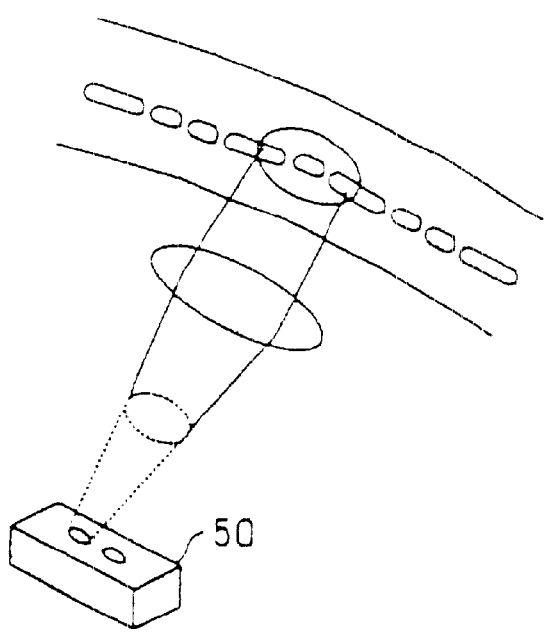
FIGS. 17A to 17C are diagrams showing a detection method employed by the photodetector unit when a track is positioned in parallel with the major axis of a beam spot.
Figure 17B:
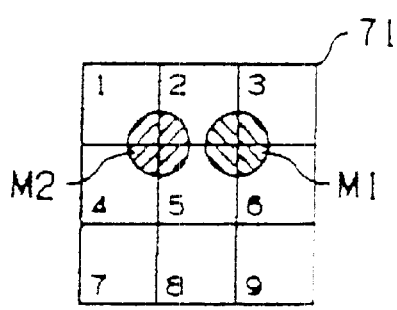
Figure 17C:
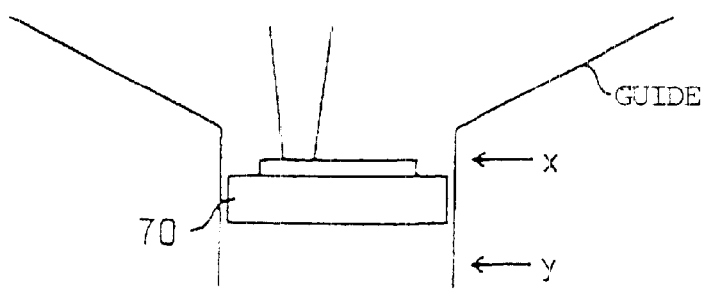

In FIGS. 17A to 17C, the semiconductor laser device 50 is positioned such that the major axis of an elliptic beam spot irradiated on a track of an optical disc 55 as a recording medium is in parallel with the track.

As illustrated in FIG. 17A, when the beam spot is irradiated on the track such that the major axis thereof is oriented in parallel with the track, the beam spot covers adjacent pits to result in a degraded resolution and a lower detection accuracy for an RF signal. However, since the beam spot illuminates a wide region on the track, a high detection accuracy is provided for an on-track detection signal. Therefore, the irradiation of the beam spot with its major axis oriented in parallel with the track is suitable for a track count search in which the beam spot is moved to a desired address while counting the track, and so on, and is appropriate for devices having a high speed search function, and so on.

In this event, as illustrated in FIG. 17B, the main beam M1 of the first laser beam incident on the nine-divided detector 71 is received by the subregions 2, 3, 5, 6, while the main beam M2 of the second laser beam is received by the subregions 1, 2, 4, 5. The photodetector unit 70 is configured to be movable only in the main light beam direction by a guiding feature illustrated in FIG. 17C, so that the spacing between receiving points of the first laser beam and the second laser beam can be set at a desired distance. Here, the photodetector unit 70 is set at a position x in FIG. 17C so as to minimize the spacing between receiving points of the first laser beam and the second laser beam.

Figure 18A:
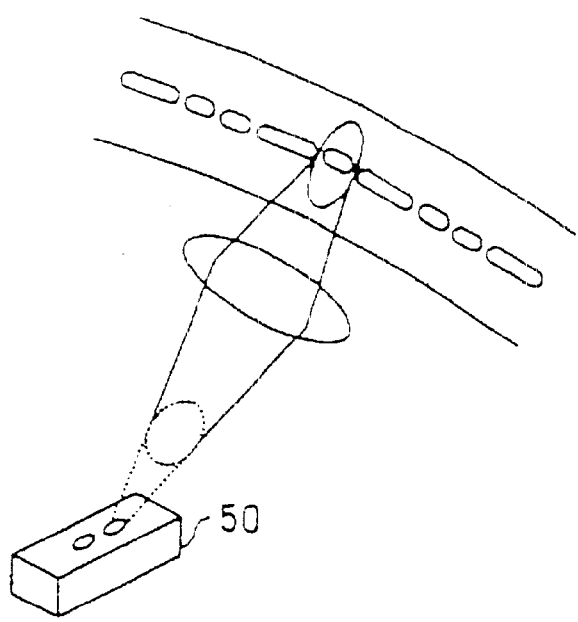
FIGS. 18A to 18C are diagrams showing a detection method employed by the photodetector unit when a track is positioned perpendicular to the major axis of the beam spot.
Figure 18B:
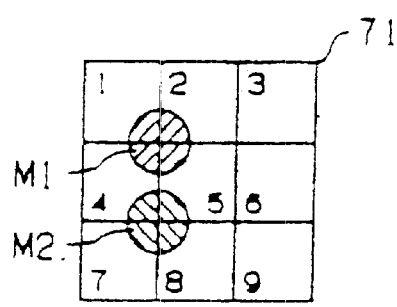
Figure 18C:
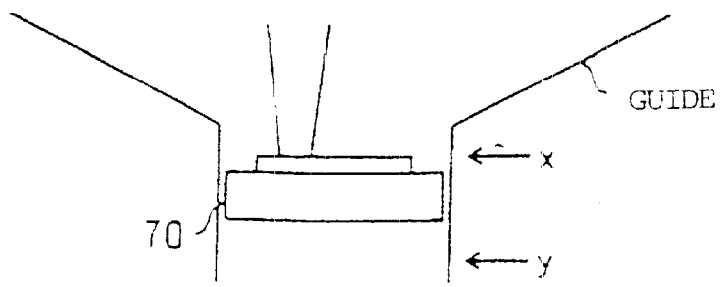

In FIGS. 18A to 18C, the semiconductor laser device 50 is positioned such that the major axis of an elliptic beam spot irradiated on a track of an optical disc 55 as a recording medium is oriented perpendicular to the track. As illustrated in FIG. 18A, since the beam spot having the major axis oriented perpendicular to the track does not cover adjacent pits, the resolution is improved as compared with the orientation illustrated in FIG. 17A, whereas the track detecting accuracy is degraded because the beam spot illuminates a smaller area on the track than the case of FIG. 17A. Therefore, the irradiation of the beam spot with its major axis oriented perpendicular to the track is appropriate for devices which prefer the accuracy of detecting a reproduced signal.

In this event, as illustrated in FIG. 18B, the main beam M1 of the first laser beam incident on the nine-divided detector 71 is received by the subregions 1, 2, 4, 5, while the main beam M2 of the second laser beam is received by the subregions 4, 5, 7, 8, whereby the main beams M1, M2 can be both received in a proper condition without moving the position of the photodetector unit 70 from the state illustrated in FIG. 17B. Also, since the spacing between light receiving points of the first and second laser beams remains unchanged from that shown in FIG. 17B, the photodetector unit 70 is set at the position x in FIG. 18C as is the case in FIG. 17C without the need for moving the photodetector unit 70 in the main beam direction along the guiding feature.

Figure 19A:
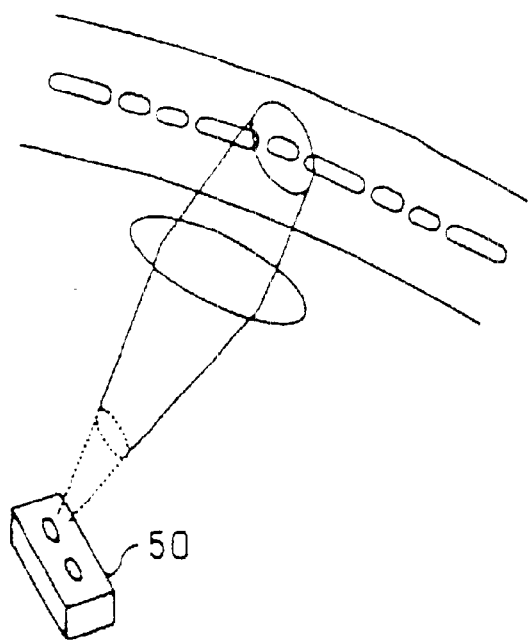
FIGS. 19A to 19C are diagrams showing a detection method employed by the photodetector unit when a track is positioned substantially at 45 degrees with respect to the major axis of the beam spot.
Figure 19B:
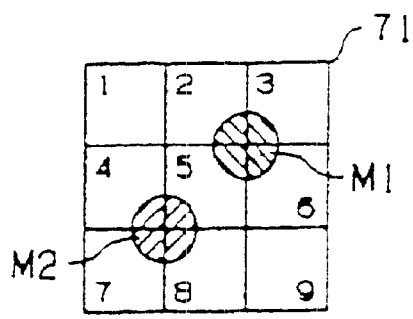
Figure 19C:
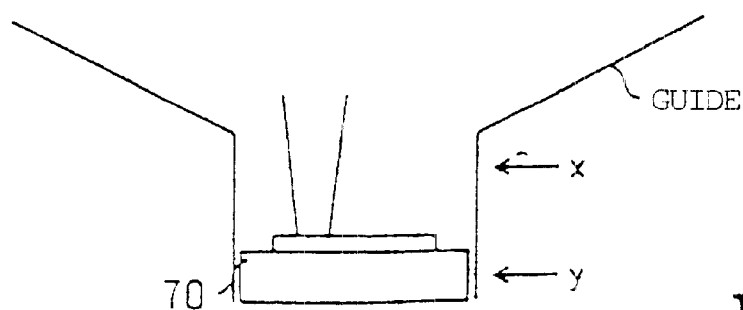

In FIGS. 19A to 19C, the semiconductor laser device 50 is positioned such that the major axis of an elliptic beam spot irradiated on a track of an optical disc 55 as a recording medium is oriented substantially at 45 degrees with respect to the track. In this orientation, the photodetector unit 70 presents intermediate performance between those resulting from the orientations illustrated in FIGS. 17 and 18, so that this is appropriate for practical devices which is free of degradation in on-track detection accuracy and reproduced signal detection accuracy.

In this event, as illustrated in FIG. 19B, the main beam M1 of the first laser beam incident on the nine-divided detector 71 is received by the subregions 2, 3, 5, 6, while the main beam M2 of the second laser beam is received by the subregions 4, 5, 7, 8, whereby the main beams M1, M2 can be both received in a proper condition without rotating the photodetector unit 70 from the state illustrated in FIG. 17B. Then, since the spacing between light receiving points of the first and second laser beams is wider than those shown in FIGS. 17B and 18B, the photodetector unit 70 is moved in the main beam direction along the guiding feature and set at a position y indicated in FIG. 19C.

As described above, when the beam spot is elliptic, the performance varies depending on the angle of the beam spot with respect to the track. Therefore, the angle of inclination of the beam spot may be set in accordance with performance requirements to provide a variety of products which meet particular performance requirements. For example, the method of FIGS. 18A to 18C, which provides a higher resolution, may be selected when an opto-electric transducing accuracy for RF signals and a conversion processing capability for the RF signals are low, and the method of FIGS. 17A to 17C, which provides a high track detection accuracy, may be selected when a high speed search is required.

As an application of the third embodiment, the photodetector unit may be implemented by a 16-divided detector comprised of subregions 1–16 arranged in four columns and four rows, or a 25-divided detector comprised of subregions 1–25 arranged in five columns and five rows. In this way, an increased number of subregions advantageously provides for variations in an adjustable range for the spacing between receiving points of the main beams M1, M2, the ability of receiving the subbeams, and so on.

Figure 20:
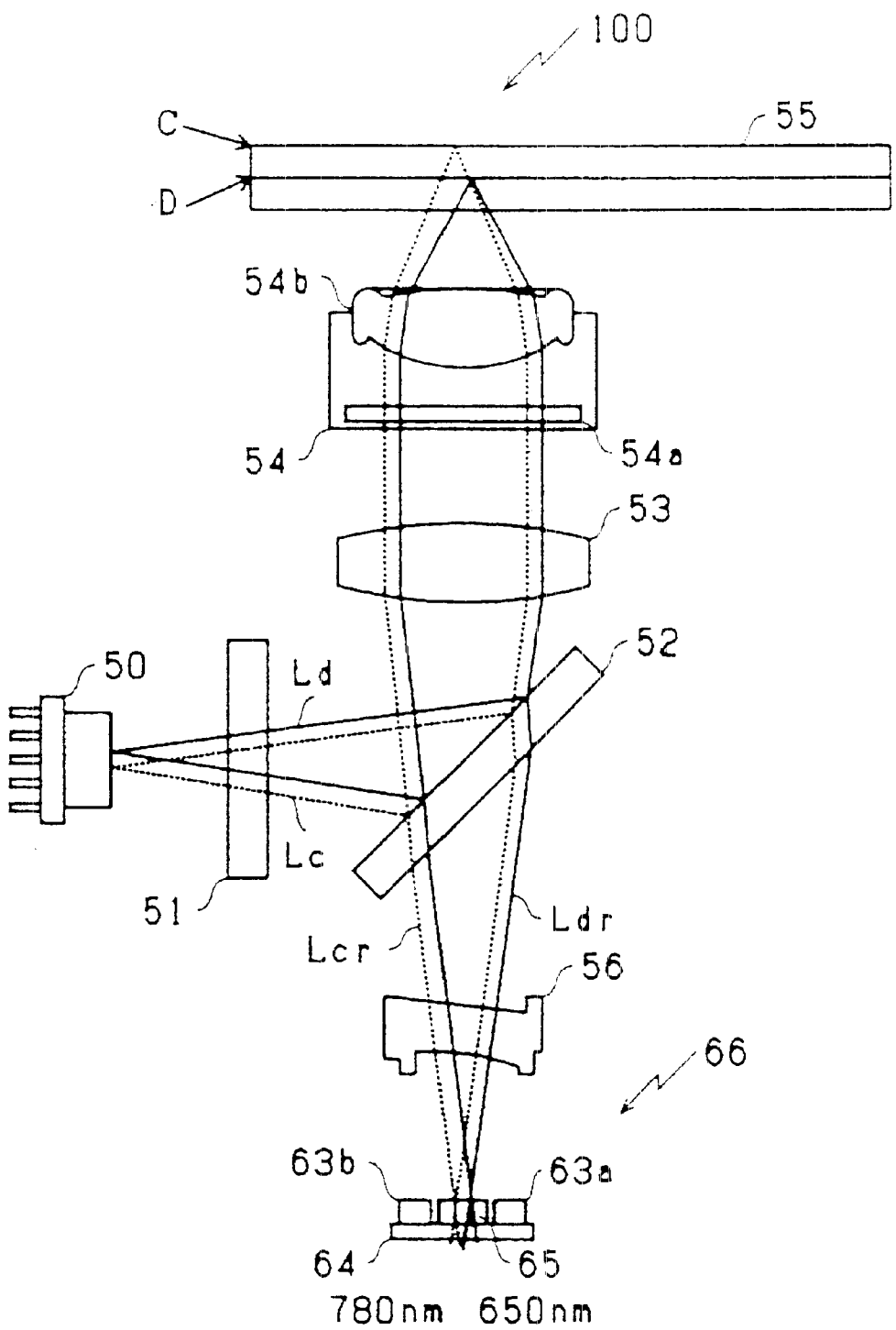
FIG. 20 is a schematic diagram illustrating an optical pickup apparatus according to a fourth embodiment of the present invention.

Next, a fourth embodiment of the optical pickup apparatus according to the present invention will be described with reference to FIGS. 20 and 21. The fourth embodiment differs from the foregoing embodiments in the positioning of the photodetector unit 66 employed in the second embodiment. The rest of the configuration is identical to that of the first to third embodiments. FIG. 20 illustrates the general configuration of the optical pickup apparatus 100 according to the fourth embodiment, and FIG. 21 illustrates the photodetector unit 66.

Figure 21:
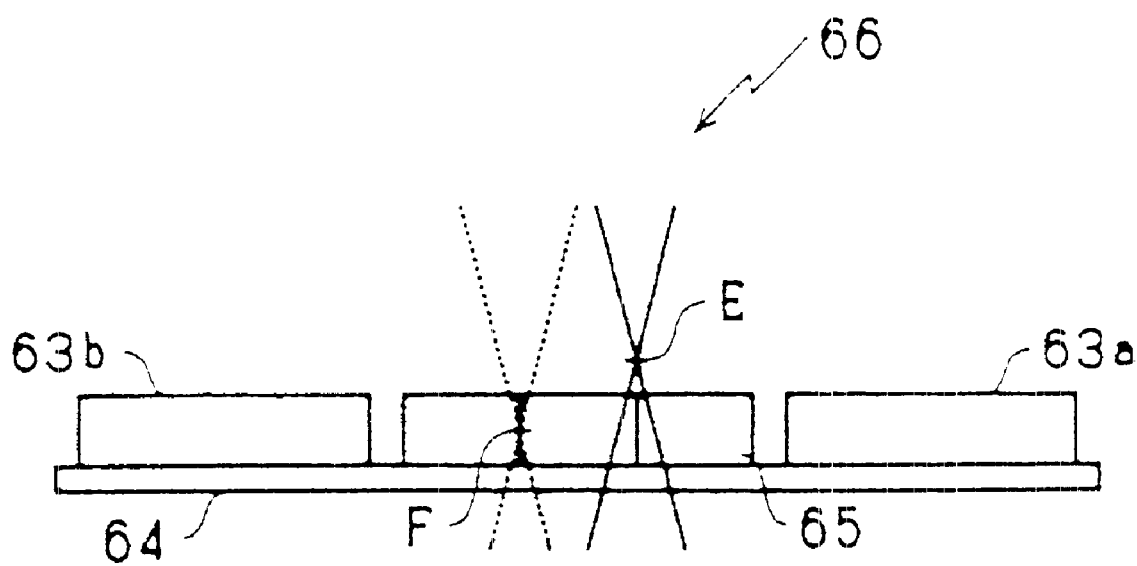
FIG. 21 is a side view of a photodetector unit used in the optical pickup apparatus according to the fourth embodiment of the present invention.

As illustrated in FIG. 21, the fourth embodiment arranges the detector section 65 such that its light receiving surface is oriented perpendicular to the main beams M1, M2. Also, the detector section 65 is arranged such that the light receiving surface is set in the main beam direction in the midway between a position E at which the main beam M1 applied with astigmatism becomes substantially circular in cross-section and a position F at which the main beam M2 likewise applied with astigmatism becomes substantially circular in cross-section.

While this positioning may result in a slight error in focus error signals of the respective main beams M1, M2, the fourth embodiment can reduce the adverse influence of chromatism while maintaining a good balance for the respective main beams M1, M2, without requiring any costly configuration or laborious positioning work such as positioning of the detector sections at different heights in the first embodiment, and the inclined arrangement of the photodetector unit in the second embodiment. Alternatively, the photodetector unit 66 may be replaced with the counterpart used in the first embodiment, illustrated in FIG. 6.

In the respective embodiments of the present invention described above, while the optical pickup apparatus 100 comprises an infinite optical system, employing the collimator lens 53 to convert diverting light to parallel light, the present invention is not limited to the infinite optical system, but may comprise a finite optical system.

Also, the configuration of the objective lens is not limited to the implementation of the bifocal lens in the foregoing embodiments, but may employ a bifocal lens formed with a plurality of parting faces by notching the lens, as described, for example, in Laid-open Japanese Patent Application No. 10-199021. Further alternatively, two objective lenses may be provided for reproducing DVD and for reproducing CD, such that these objective lenses are switched for use with the associated optical disc.

Further, the method of adjusting the focus servo and the tracking servo is not limited to the implementation employed in the foregoing embodiments, but any of a variety of known methods may be employed. In addition, the same adjusting method need not be used for reproducing DVD and for reproducing CD. Alternatively, a combination of different methods may be employed, for example, the tracking servo adjustment may be made in accordance with the three-beam method for reproducing CD and in accordance with the phase difference method for reproducing DVD.

According to the present invention, it is possible to reduce the number of parts in the optical system, resulting from the elimination of a combining prism, and to intensively arrange the optical system, leading to a reduction in cost and space. It is also possible to reduce an error in the focus error signal caused by chromatism to accomplish proper focus servo adjustments.

What is claimed is:

1. An optical pickup apparatus capable of reading information on recording media read by laser beams at different wavelengths, comprising:

a light emitter integrally including a first light source for emitting a first laser beam, and a second light source positioned in close proximity to said first light source for emitting a second laser beam at a wavelength different from a wavelength of said first laser beam; and an optical system including a plurality of optical elements passed by both said first and second laser beams for forming a light path for leading said first and second laser beams to a recording medium and for leading reflected light reflected by said recording medium to a light detector, wherein said light detector includes a first detector for receiving said first laser beam and a second detector positioned in close proximity to said first detector for receiving said second laser beam, said first and second detectors are arranged at positions such that said first and second laser beams follow return light paths of different lengths from said recording medium to said first and second detectors, and said light detector is arranged between two positions at which return light of said first and second laser beams presents a substantially circular beam cross-section, with light receiving surfaces oriented perpendicular to the return light of said first and second laser beams.

2. An optical pickup apparatus according to claim 1, wherein said first and second laser beams follow different light paths from said light emitter to said light detector.

3. An optical pickup apparatus according to claim 1, wherein said first and second detectors are set at positions at which said first and second detectors receive focal points of said return light of said first and second laser beams, respectively.

4. An optical pickup apparatus according to claim 1, wherein said optical system includes an astigmatism element for applying said return light with astigmatism.

5. An optical pickup apparatus according to claim 1, wherein said detector includes said first and second detectors on the same plane, and is inclined with respect to said reflected beams.

6. An optical pickup apparatus according to claim 1, wherein said light detector includes said first and second detectors formed at different heights, and is oriented substantially perpendicular to said return light.

7. An optical pickup apparatus according to claim 1, wherein said light emitter comprises a one-chip laser diode which is formed with an electrode of one of said first and second light sources as a common electrode.

8. An optical pickup apparatus according to claim 1, wherein said light detector is configured to selectively drive one of said first and second light sources depending on the type of a recording medium to be read.

9. An optical pickup apparatus capable of reading information on recording media read by laser beams at different wavelengths, comprising:

a light emitter integrally including a first light source for emitting a first laser beam, and a second light source positioned in close proximity to said first light source for emitting a second laser beam at a wavelength different from a wavelength of said first laser beam; and an optical system including a plurality of optical elements passed by both said first and second laser beams for forming a light path for leading said first and second laser beams to a recording medium and for leading reflected light reflected by said recording medium to light detector, wherein said optical system includes an astigmatism element for applying said return light with astigmatism;

said light detector includes a first detector for receiving said first laser beam and a second detector for receiving said second laser beam, configured such that light receiving surfaces thereof lie in the same plane; and said light detector is arranged between two positions at which return light of said first and second laser beams presents a substantially circular beam cross-section, with said receiving surfaces oriented perpendicular to the return light of said first and second laser beams.

10. An optical pickup apparatus according to claim 9, wherein said light emitter comprises a one-chip laser diode which is formed with an electrode of one of said first and second light sources as a common electrode.

11. An optical pickup apparatus according to claim 9, wherein said light detector is configured to selectively drive one of said first and second light sources depending on the type of a recording medium to be read.

* * * * *